US010969966B2

(12) United States Patent
Zhao et al.

(10) Patent No.: US 10,969,966 B2
(45) Date of Patent: Apr. 6, 2021

(54) METHOD AND DEVICE FOR DATA READ AND WRITE

(71) Applicant: EMC IP Holding Company LLC, Hopkinton, MA (US)

(72) Inventors: Bean Bin Zhao, Tianjin (CN); Wilson Guoyu Hu, Beijing (CN); Jun Wu, Shanghai (CN); Shuo Lv, Beijing (CN); Qiaosheng Zhou, Beijing (CN); Lester Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/684,249

(22) Filed: Nov. 14, 2019

(65) Prior Publication Data

US 2020/0081626 A1 Mar. 12, 2020

Related U.S. Application Data

(63) Continuation of application No. 15/995,192, filed on Jun. 1, 2018, now Pat. No. 10,489,058.

(30) Foreign Application Priority Data

Jun. 2, 2017 (CN) .......................... 201710409905.8

(51) Int. Cl.
*G06F 3/06* (2006.01)
*G06F 16/176* (2019.01)
*G06F 16/17* (2019.01)

(52) U.S. Cl.
CPC .......... *G06F 3/0611* (2013.01); *G06F 3/0613* (2013.01); *G06F 3/0659* (2013.01); *G06F 3/0673* (2013.01); *G06F 16/1767* (2019.01)

(58) Field of Classification Search
CPC .... G06F 3/0611; G06F 3/0613; G06F 3/0659; G06F 13/1767; G06F 16/1767
USPC ........................................................... 710/36
See application file for complete search history.

(56) References Cited

U.S. PATENT DOCUMENTS

| 5,761,659 | A | 6/1998 | Bertoni |
| 6,490,635 | B1 | 12/2002 | Holmes |
| 7,831,642 | B1 | 11/2010 | Kumaresan et al. |
| 9,213,717 | B1 | 12/2015 | Pawar et al. |
| 9,378,052 | B1 | 6/2016 | Dou et al. |
| 9,864,643 | B1 | 1/2018 | Mullis, II et al. |
| 2008/0256074 | A1 | 10/2008 | Lev et al. |
| 2010/0030980 | A1* | 2/2010 | Yamada .............. G06F 13/1668 711/157 |

(Continued)

*Primary Examiner* — Christopher B Shin
(74) *Attorney, Agent, or Firm* — BainwoodHuang

(57) ABSTRACT

Embodiments of the present disclosure relate to method and device for data read/write. The method comprises: in response to receiving a first read/write request for a first target area, determining whether there is a second read/write request under execution in conflict with the first read/write request, a second target area for the second read/write request at least partially overlapping with the first target area, and at least one of the first read/write request and the second read/write request being a write request; and in response to determining there being the second read/write request in conflict, suspending the first read/write request while maintaining a sub-area of the first target area in an unlocked state, the sub-area not overlapping with the second target area.

17 Claims, 9 Drawing Sheets

(56) References Cited

U.S. PATENT DOCUMENTS

| | | | |
|---|---|---|---|
| 2011/0078393 A1* | 3/2011 | Lin | G06F 3/0679 |
| | | | 711/155 |
| 2015/0120992 A1* | 4/2015 | Yamazoe | G06F 3/0644 |
| | | | 711/103 |
| 2016/0004718 A1 | 1/2016 | Lin et al. | |
| 2017/0293566 A1* | 10/2017 | Feng | G06F 12/0246 |
| 2018/0189225 A1* | 7/2018 | Ramaswamy | G06F 13/1631 |
| 2018/0293188 A1 | 10/2018 | Katayama | |
| 2018/0321943 A1 | 11/2018 | Han et al. | |

* cited by examiner

METHOD AND DEVICE FOR DATA READ AND WRITE

RELATED APPLICATIONS

This application is a continuation of U.S. patent application Ser. No. 15/995,192, filed Jun. 1, 2018 and entitled "METHOD AND DEVICE FOR DATA READ AND WRITE," which claims benefit of the priority of Chinese Patent Application No. CN201710409905.8, filed on Jun. 2, 2017 at the State Intellectual Property Office, China, titled "METHOD AND DEVICE FOR DATA READING AND WRITING." The contents and teachings of both prior applications are incorporated herein by reference in their entirety.

FIELD

Embodiments of the present disclosure generally relate to the field of data read and write, and more specifically, to a method and device for data read and write.

BACKGROUND

In conventional storage systems, the storage system typically can receive a plurality of read/write requests. The target area for the executed read/write request will be locked, thereby avoiding conflicts between a plurality of read/write requests. Meanwhile, the total target area of the read/write requests which are suspended due to partial lock of the target area will also be locked. Therefore, the storage space which is in fact not accessed cannot be read and written due to the lockup, thereby decreasing the overall response speed of the storage system.

Thus, it has become the focus of attention that how to improve concurrency level of a plurality of read/write requests for the storage system without any read/write request conflict.

SUMMARY

Embodiments of the present disclosure provide a solution for data read and write.

According to a first aspect of the present disclosure, there is provided a method for data read and write. The method comprises: in response to receiving a first read/write request for a first target area, determining whether there is a second read/write request under execution in conflict with the first read/write request, a second target area for the second read/write request at least partially overlapping with the first target area and at least one of the first read/write request and the second read/write request being a write request; and in response to determining there being the second read/write request in conflict, suspending the first read/write request while maintaining a sub-area of the first target area in an unlocked state, the sub-area not overlapping with the second target area.

According to a second aspect of the present disclosure, there is provided a method for data writing. The method comprises: in response to receiving a first write request for a file system, splitting the first write request into at least one sub-request on the basis of logic data unit of the file system; determining whether there is a first sub-request for a data block whose size is smaller than the logic data unit in the at least one sub-request; in response to determining there being the first sub-request, determining whether there is a currently suspended second write request which can be merged with the first sub-request; and in response to determining there being the second write request, merging the first write sub-request and the second write request for execution.

According to a third aspect of the present disclosure, there is provided an electronic device. The device comprises: at least one processing unit; at least one memory coupled to the at least one processing unit and stored with instructions executed by the at least processing unit, the instructions, when executed by the at least one processing unit, causing the device to execute actions comprising: in response to receiving a first read/write request for a first target area, determining whether there is a second read/write request under execution in conflict with the first read/write request, a second target area for the second read/write request at least partially overlapping with the first target area and at least one of the first read/write request and the second read/write request being a write request; and in response to determining there being the second conflicted read/write request, suspending the first read/write request while maintaining a sub-area of the first target area in an unlocked state, the sub-area not overlapping with the second target area.

According to a fourth aspect of the present disclosure, there is provided an electronic device. The device comprises: at least one processing unit; at least one memory coupled to the at least one processing unit and stored with instructions executed by the at least processing unit, the instructions, when executed by the at least one processing unit, causing the device to execute actions comprising: in response to receiving a first write request for a file system, splitting the first write request into at least one sub-request on the basis of logic data unit of the file system; determining whether which is a first sub-request for a data block whose size is smaller than the logic data unit in the at least one sub-request; in response to determining there being the first sub-request, determining whether there is a second write request which can be merged with the first sub-request, the second write request being currently suspended; in response to determining there being the second write request, merging the first write sub-request and the second write request for execution.

In a fifth aspect of the present disclosure, there is provided a computer program. The computer program is tangibly stored on a computer-readable medium and comprises machine-executable instructions, the machine-executable instructions, when executed, enabling a machine to implement the methods described according to the first aspect and the second aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, wherein the identical reference sign refers to the identical elements in the example embodiments of the present disclosure.

DETAILED DESCRIPTION OF EMBODIMENTS

Figure 1:
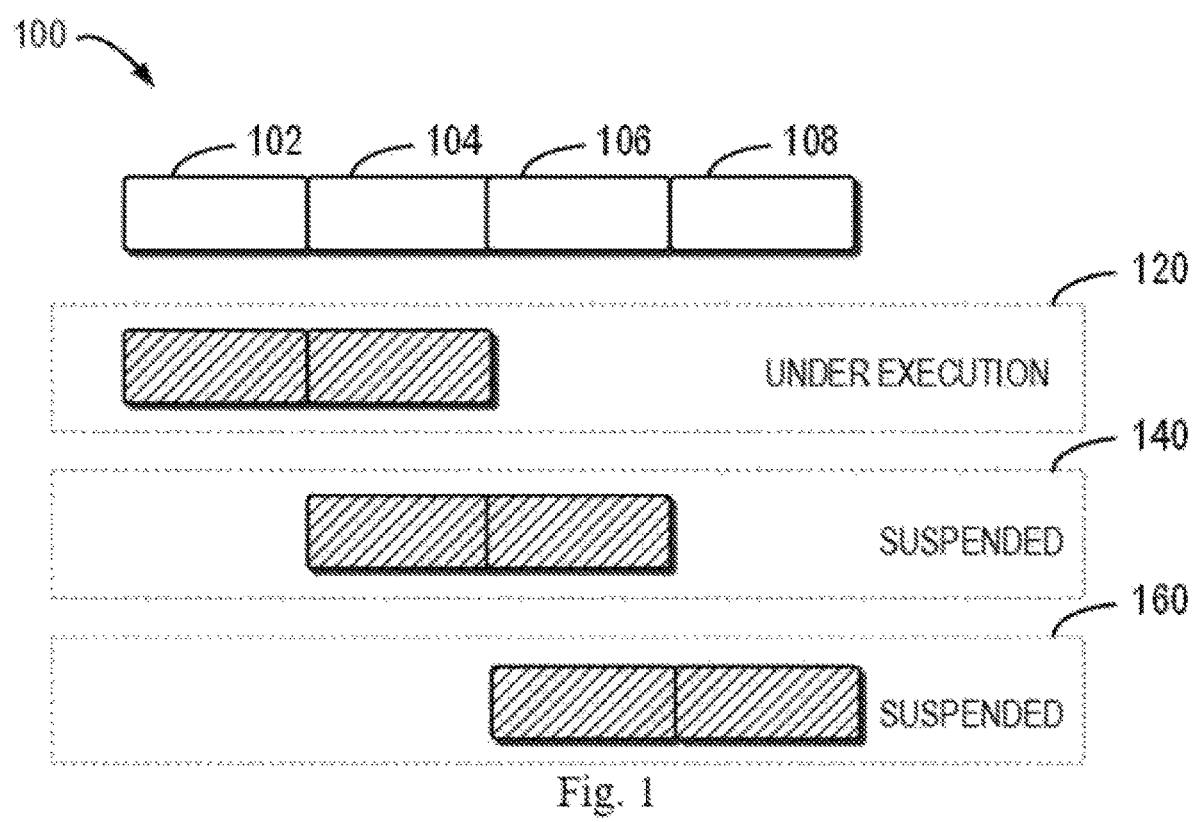
FIG. 1 illustrates a schematic diagram of data read and write in a traditional solution.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

For the purpose of description, embodiments of the present disclosure will describe conflicts between a plurality of read/write requests through a plurality of concurrent write requests. Those skilled in the art should understand that the method described in this text is also applicable for confliction between read requests and write requests.

As described above, the concurrency level of the conventional storage system is low to process a plurality of read/write requests. FIG. 1 illustrates a schematic diagram 100 of data read and write in a conventional solution. As shown in FIG. 1, the storage area includes a plurality of continuous logic data units 102-108. The system receives from the users a plurality of write requests, i.e., a first write request 120, a second write request 140 and a third write request 160.

A target area for the first write request 120 comprises logic data units 102 and 104. As the target area is not locked, the first write request 120 may be executed and its target area (logic data units 102 and 104) is then simultaneously locked. A target area for the second write request 140 comprises logic data units 104 and 106. Because the first write request 120 locks the logic data unit 104, the second write request 140 is suspended as its target area contains a locked area, and the target area (logic data units 104 and 106) of the second write request 140 is then also locked. A target area for the third write request 160 comprises logic data units 106 and 108. Because the second write request 140 locks the logic data unit 106, the third write request 160 is suspended as its target area contains a locked area and the target area (logic data units 106 and 108) of the third write request 160 is then also locked. However, when the first write request 120 is executed, the logic data units 106 and 108 are in fact not being written, i.e., the first write request 120 and the third write request 160 have concurrency, but this concurrency cannot be implemented because the second write request 140 locks all of its target areas, thereby impacting the overall response speed of the storage system.

Besides, the existing file-level storage typically employs 8 KB as a logic data unit. However, there are 4 KB-aligned write requests in some operating systems, such as Linux. When the storage system processes a plurality of 4 KB-aligned requests, performance of the storage system will be severely degraded.

Figure 2:
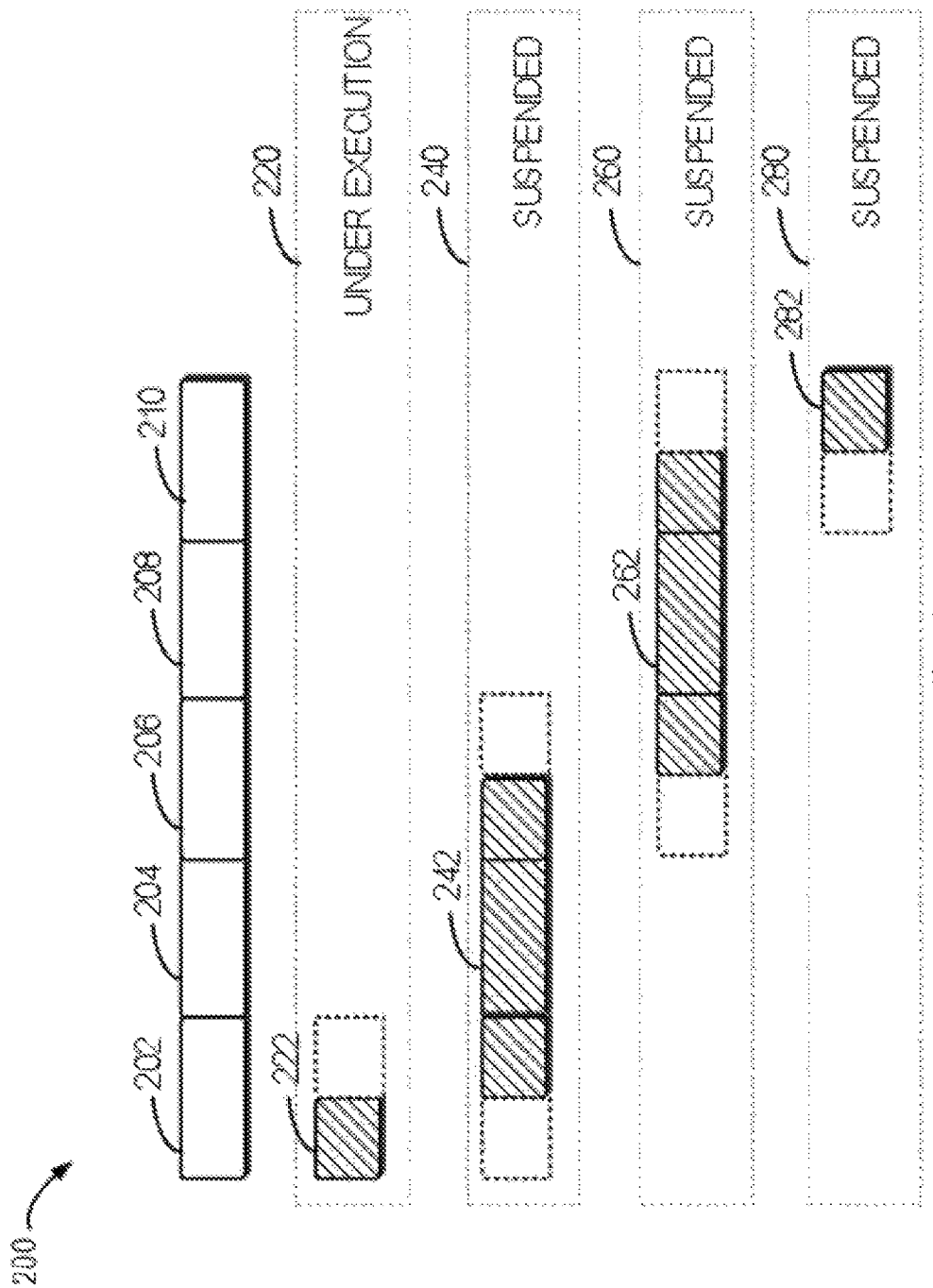
FIG. 2 illustrates schematic diagram of non-aligned data write in a traditional solution.

FIG. 2 illustrates a schematic diagram 200 of non-aligned data write in a traditional solution. As shown in FIG. 2, the storage area includes a plurality of continuous logic data units 202-210. In some embodiments, a single logic data unit can be of the size of 8 KB. The system receives from users a plurality of write requests, i.e., a first write request 220, a second write request 240, a third write request 260 and a fourth write request 280.

The target area for the first write request 220 is a first target area 222, which is smaller than the size of a single logic data unit. In some embodiments, for example, the first target area 222 can be of the size of 4 KB. Because the first target area 222 is not locked, the first write request 220 is then executed. However, since the minimum unit of the lock of the storage system is a single logic data unit, the total logic data unit 202 is locked.

The target area for the second write request 240 is the second target area 242. It can be seen from FIG. 2 that the second target area 242 includes a part of logic data unit 202, logic data unit 204 and a part of logic data unit 206. Because the first write request 220 locks the logic data unit 202, the second target area 242 comprises a locked area. Accordingly, the second write request 240 is suspended and all logic data units 202, 204 and 206 associated with the second target area 242 are then simultaneously locked. Likewise, the third target area 262 of the third write request 260 contains a locked area, the third write request 260 is therefore suspended and all logic data units 206, 208 and 210 associated with the third target area 262 are locked.

The fourth target area 282 for the fourth write request 280 is smaller than the size of a single logic data unit. In some embodiments, the fourth target area 282 can be of the size of 4 KB. Because the third write request 260 locks the logic data unit 210, the fourth target area 282 is then locked. Accordingly, the fourth write request 280 is suspended and the logic data unit 210 corresponding to the fourth target area 282 is locked.

In the example shown in FIG. 2, as the unit size of the write request fails to align with the size of the logic data unit, concurrency originally existing in the plurality of requests (such as, first write request 220 with the third write request 260, and the first write request 220 with the fourth write request 280) cannot be implemented, thereby impacting the overall response speed of the storage system.

To at least partially solve the above problems and other potential problems, embodiments of the present disclosure provide a solution of data read and write. According to various example embodiments of the present disclosure, with regard to a plurality of read/write requests, when the target areas for the read/write request are locked, the read/write requests are suspended without locking all of their target areas, such that other write requests which are not in conflict with the target areas for the read/write requests under execution can be executed, and the write efficiency is improved by performing the concurrent processing on the read/write requests which are not in conflict. Besides, a plurality of write requests whose unit size is not in alignment with the size of the logic data unit is to be split into at least one sub-request, and a plurality of sub-requests are merged, so as to improve efficiency of a single write, enhance concurrency level of the plurality of write requests in the storage system, and expedite the overall response speed of the storage system.

Based on such write mechanism, the solution described herein solves the problem about locking the space that is not being read or written and low efficiency of the file system in terms of processing the write requests whose unit size is not in alignment with the logic data unit size. Thus, it can greatly improve concurrency level of the read/write requests and improve efficiency of the storage system.

Figure 3:
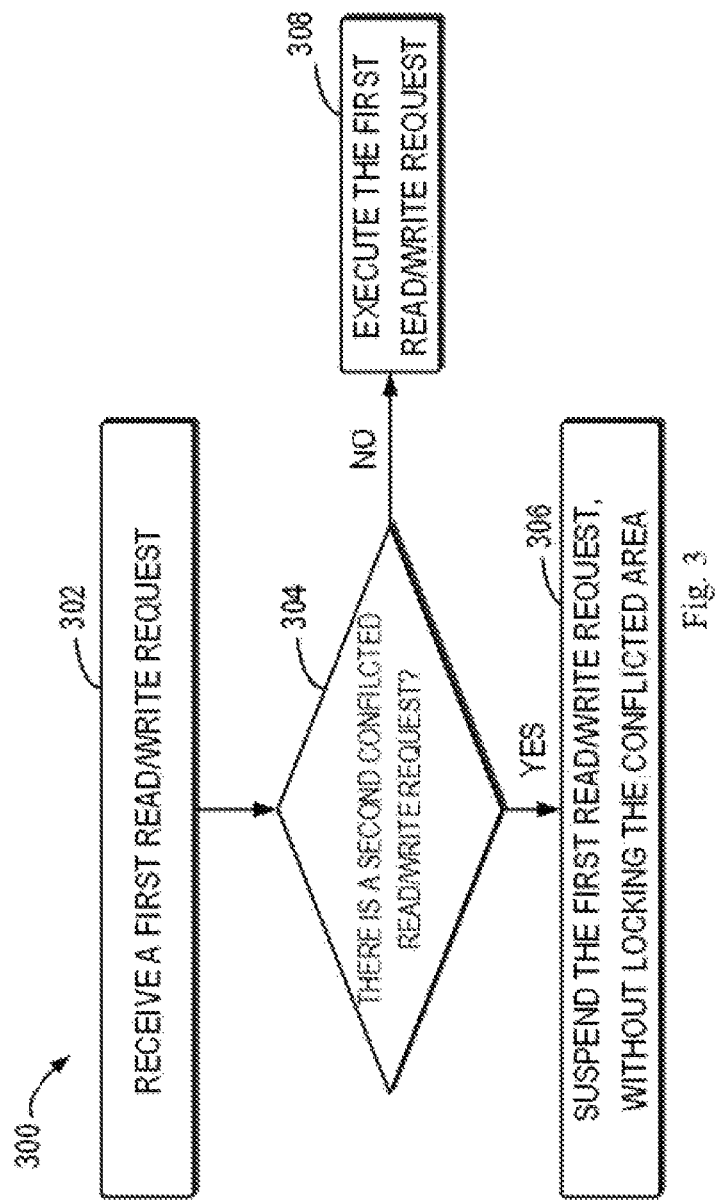
FIG. 3 illustrates a flowchart of a method for data read and write according to embodiments of the present disclosure.

The method for data read and write according to the present disclosure will be described in details with reference to FIGS. 3-4. FIG. 3 illustrates a flowchart of a method 300 for data read and write according to embodiments of the present disclosure; and FIG. 4 illustrates a schematic diagram 400 of data read and write according to embodiments of the present disclosure.

At block 302, a system receives a first read/write request. In some embodiments, the first read/write request can be a read/write request for a file system, wherein the file system includes, but not limited to, disk-based file system, virtual file system and network file system. In some embodiments, the first read/write request also can be a read/write request for a storage device, wherein the storage device includes, but not limited to, electromagnetic hard disk drive (HDD), solid-state drive (SSD), flash, random-access memory (RAM) and the like.

At block 302, the system determines whether there is a second read/write request under execution, which is in conflict with the first read/write request. Specifically, the system determines whether the first target area for the first read/write request at least partially overlaps with the second target area for the second read/write request and at least one of the first read/write request and the second read/write request is a write request.

Figure 4:
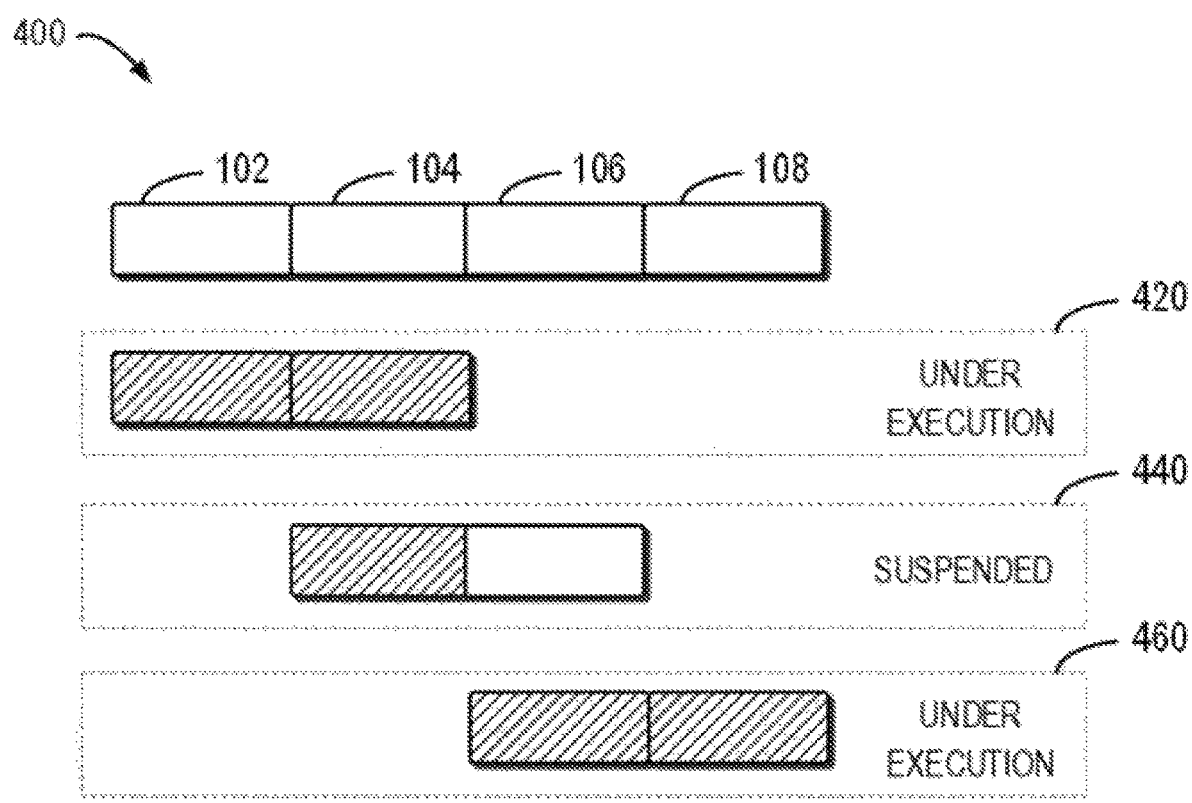
FIG. 4 illustrates a schematic diagram of data read and write according to embodiments of the present disclosure.

For example, with reference to FIG. 4, it describes the process of data read and write by taking a plurality of concurrent write requests as example. The target area for the write request 420 comprises the logic data units 102 and 104; the target area for the write request 440 comprises logic data units 104 and 106; the target area for the write request 460 is logic data units 106 and 108. That is, the target area for the write request 420 overlaps with the target area for the write request 440 and the target area for the write request 440 overlaps the target area for the write request 460. Therefore, the write request 420 is in conflict with the write request 440 and the write request 440 is in conflict with the write request 460. However, there are no conflicts between the write request 420 and the write request 460.

If there is a second read/write request under execution in conflict with the first read/write request, the method proceeds to block 306, i.e., the system suspends the first read/write request and does not lock a partial area of the first read/write request which is not in conflict with the second read/write request. For example, with reference to FIG. 4, the request 440 is in conflict with the write request 420 under execution, so the system suspends the write request 440 without locking the target area (logic data unit 104) which is not in conflict with the write request 440 of the write request 420.

If there is not a second read/write request under execution in conflict with the first read/write request, the method proceeds to block 308, i.e., the system executes the first read/write request despite whether the first read/write request is in conflict with the read/write requests which are currently suspended. For example, with reference to FIG. 4, the request 460 is not in conflict with the write request 420 under execution, so the system executes the write request 460 despite that the write request 460 is in conflict with the suspended write request 440, and locks its target area (logic data units 106 and 108).

Moreover, when execution of the first read/write request is completed, the system can notify a currently suspended read/write request to determine whether it can be executed. In some embodiments, the system can only notify a read/write request which is in conflict with the first read/write request to determine whether it can be executed, so as to improve system efficiency.

Figure 5:
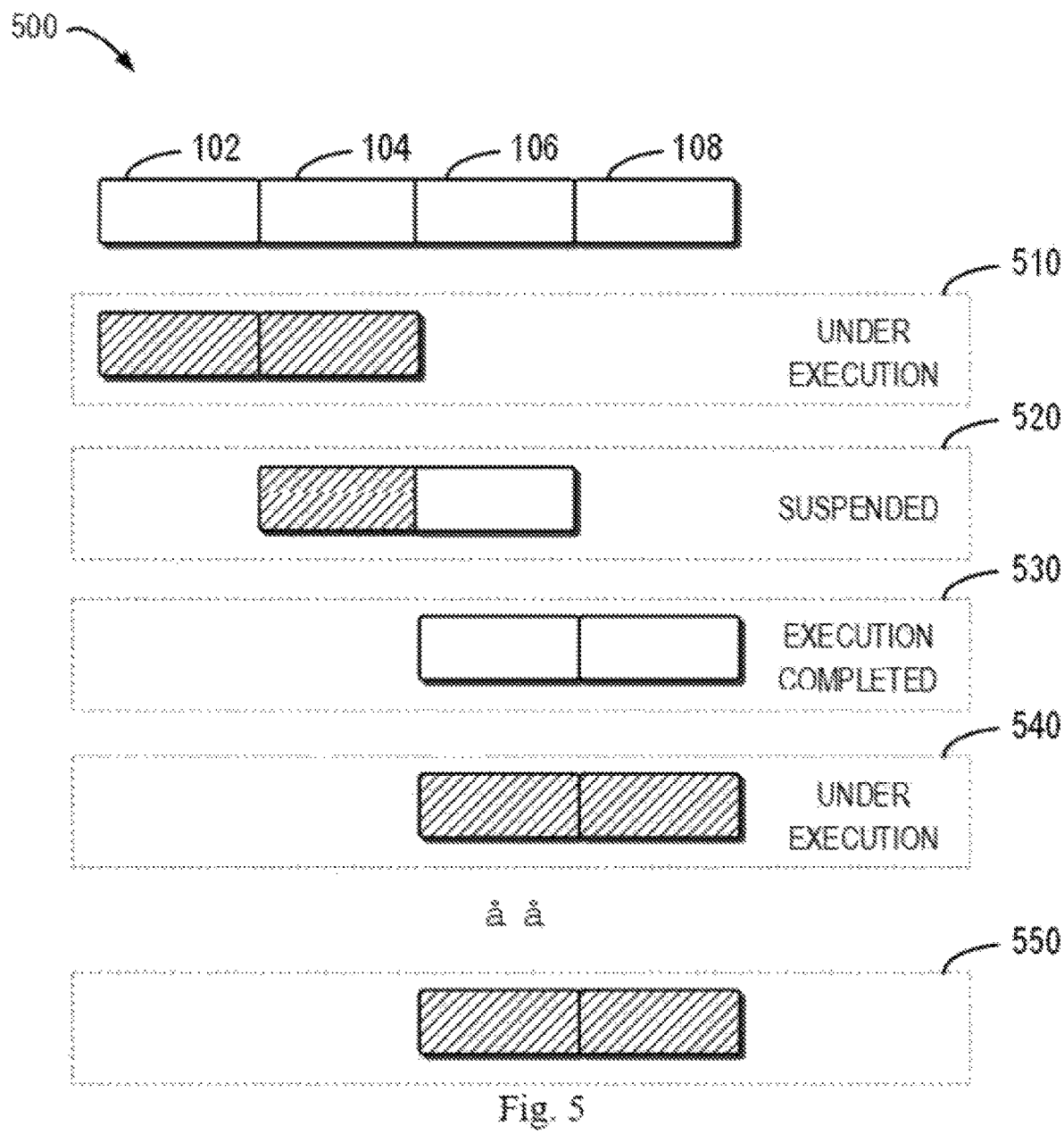
FIG. 5 illustrates a schematic diagram of data read and write based on priority according to embodiments of the present disclosure.

Based on such read/write mechanism, the concurrency level of a plurality of read/write requests in the system can be improved. However, there is still such a scenario: a certain read/write request cannot be executed all along because its target area is constantly locked. In terms of this problem, the present disclosure also proposes a mechanism of preventing the read/write request from not being executed for a long time based on priority. The method for data read and write based on priority will be described with reference to FIGS. 5-6. FIG. 5 illustrates a schematic diagram of data read/write based on priority according to embodiments of the present disclosure.

The system can configure an associated counter for each suspended read/write request. When a following third read/write request in conflict with the suspended first write request is executed, the counter associated with the first write request increments. Specifically, with reference to FIG. 5, it describes data read and write based on priority by taking a plurality of write requests as example. After the completion of the execution of the write request 530, the system receives a new write request 540 whose target area is consistent with the write request 530 (logic data units 106 and 108). At this time, the write request 510 is still under execution, so the target area for the request 520 still contains a locked area and cannot be executed accordingly. However, the target area for the write request 540 becomes available as the execution of the write request 530 is completed. Thus, the system will execute the following write request 540 and increments the counter associated with the request 520. Assuming that the write request 510 is constantly under execution and a new write request with a target area of the logic data units 106 and 108 is received, or the execution of the write request 510 is completed and the write request 540 is under execution, then the logic data unit 106 will be locked at this moment. However, when the system receives a new write request with a target area of the logic data units 102 and 104, the system will execute this request prior to the write request 520. In this case, the counter of the write request 520 will increment.

Furthermore, in order to prevent the read/write request from not being executed for a long time due to the locked target area, when the counter value reaches a threshold, the system can promote the execution priority of the first read/write request, wherein the initial execution priority of all read/write requests can be set as 0. For example, when the counter of the write request 520 reaches the threshold (e.g., 5 times), the execution priority of the write request 520 will be added with 1.

Figure 6:
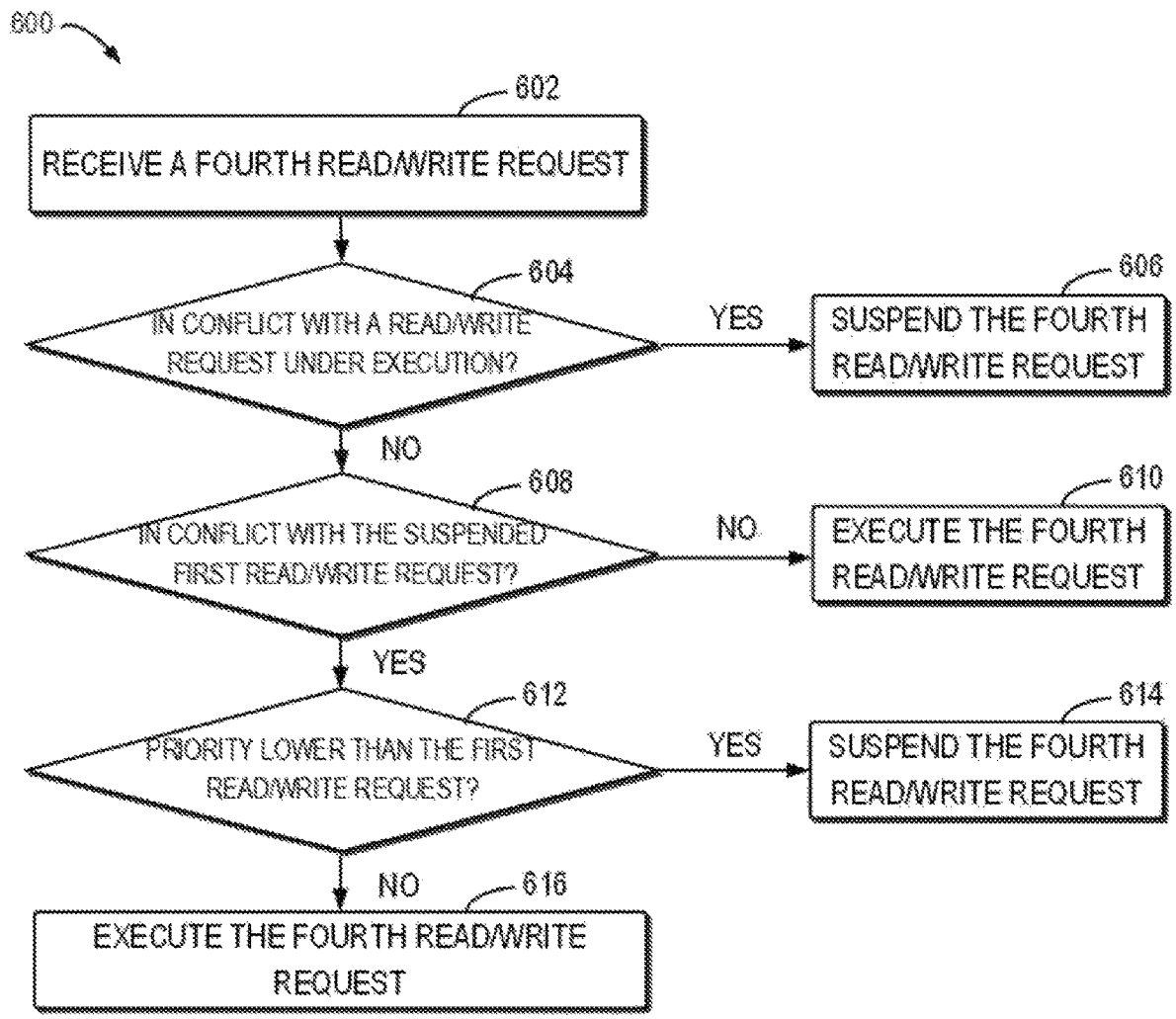
FIG. 6 illustrates a flowchart of a method for data read and write based on priority according to embodiments of the present disclosure.

FIG. 6 illustrates a flowchart of a method 600 of data read/write based on the execution priority according to embodiments of the present disclosure. At block 602, the system receives a fourth read/write request. For example, as shown in FIG. 5, the system receives a new write request 550. At block 604, the system determines whether the fourth read/write request is in conflict with the read/write request under execution. When the system determines that the fourth read/write request is in conflict with the read/write request under execution, the method proceeds to block 606, i.e., the system suspends the fourth read/write request. When the system determines that the fourth read/write request is not in conflict with the read/write request under execution, the method proceeds to block 608. For example, the write request 550 shown in FIG. 5 is not in conflict with the write request 510 under execution.

At block 608, the system determines whether the fourth read/write request is in conflict with a first read/write request which is currently suspended. For example, with reference to FIG. 5, the write request 550 is in conflict with the currently suspended write request 520. When the system determines that the fourth read/write request is not in conflict with the first read/write request, the method proceeds to block 610, i.e., the system executes the fourth read/write request. When the system determines that the fourth read/write request is in conflict with the first read/write request, the method proceeds to block 612.

At block 612, the system determines whether the execution priority of the fourth read/write request is lower than the execution priority of the first read/write request. When the system determines that the execution priority of the fourth read/write request is lower than the execution priority of the first read/write request, the method proceeds to block 614, i.e., the system suspends the fourth read/write request. When the system determines that the execution priority of the fourth read/write request is not lower than the execution priority of the first read/write request, the method proceeds to block 612, i.e., the system executes the fourth read/write request. Specifically, in FIG. 5, the execution priority of the write request 550 is 0. However, as described above, the execution priority of the write request 520 depends on whether its counter reaches a threshold. If the counter of the write request 520 reaches the threshold, the priority of the write request 520 is 1. At this time, the system suspends the write request 550, such that the write request 520 can be executed first time when execution of the write request 510 is completed, which avoids a very long waiting time; besides, if the counter of the write request 520 fails to reach the threshold, the threshold of the write request 520 is still 0 at this moment. Then, the system will execute the write request 550 and increment the counter of the write request 520.

In this way, the system can effectively avoid the situation that some write requests are not executed for a long time, which is not expected by the users.

Figure 7:
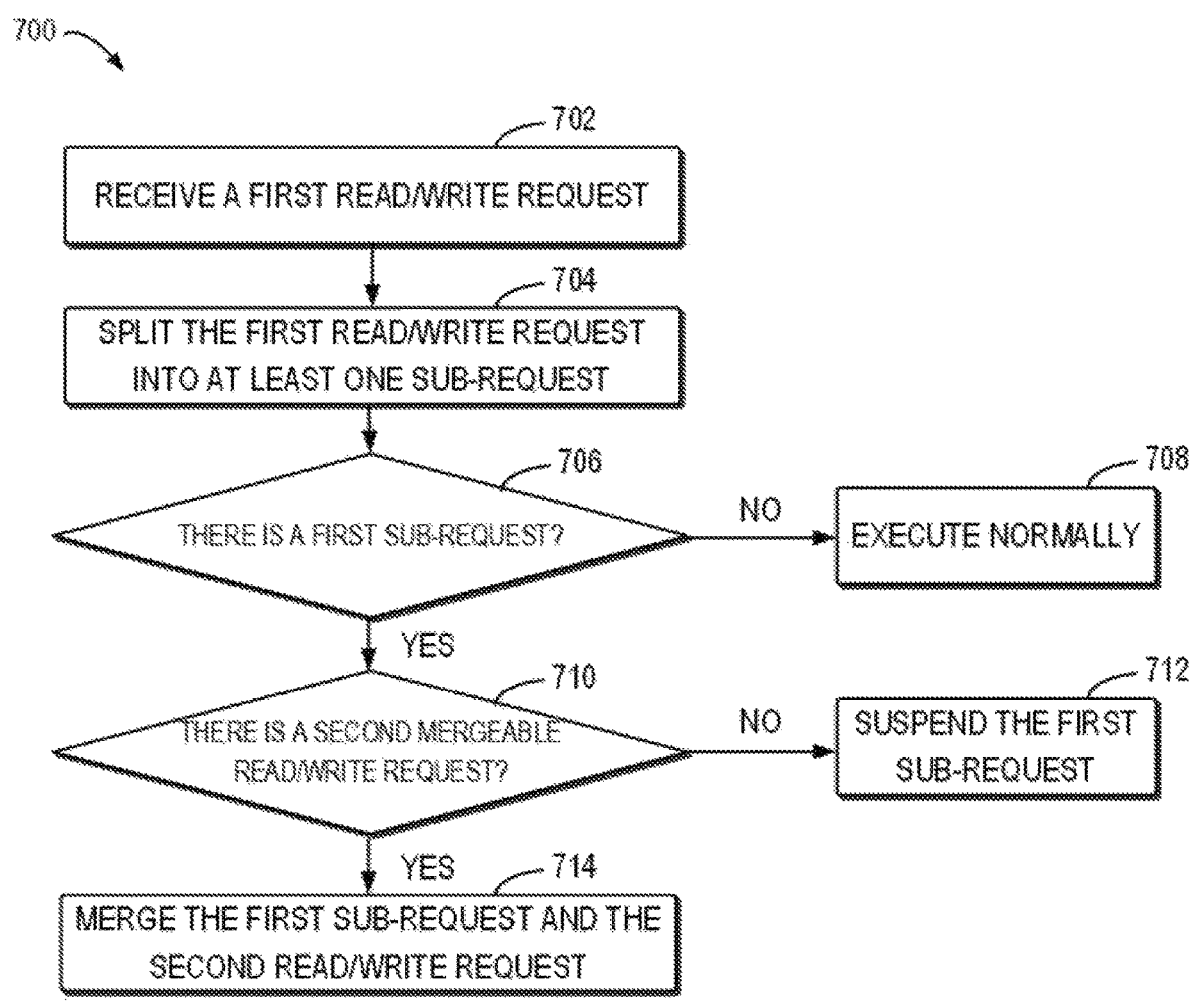
FIG. 7 illustrates a flowchart of a method for non-aligned data write according to embodiments of the present disclosure.
Figure 8:
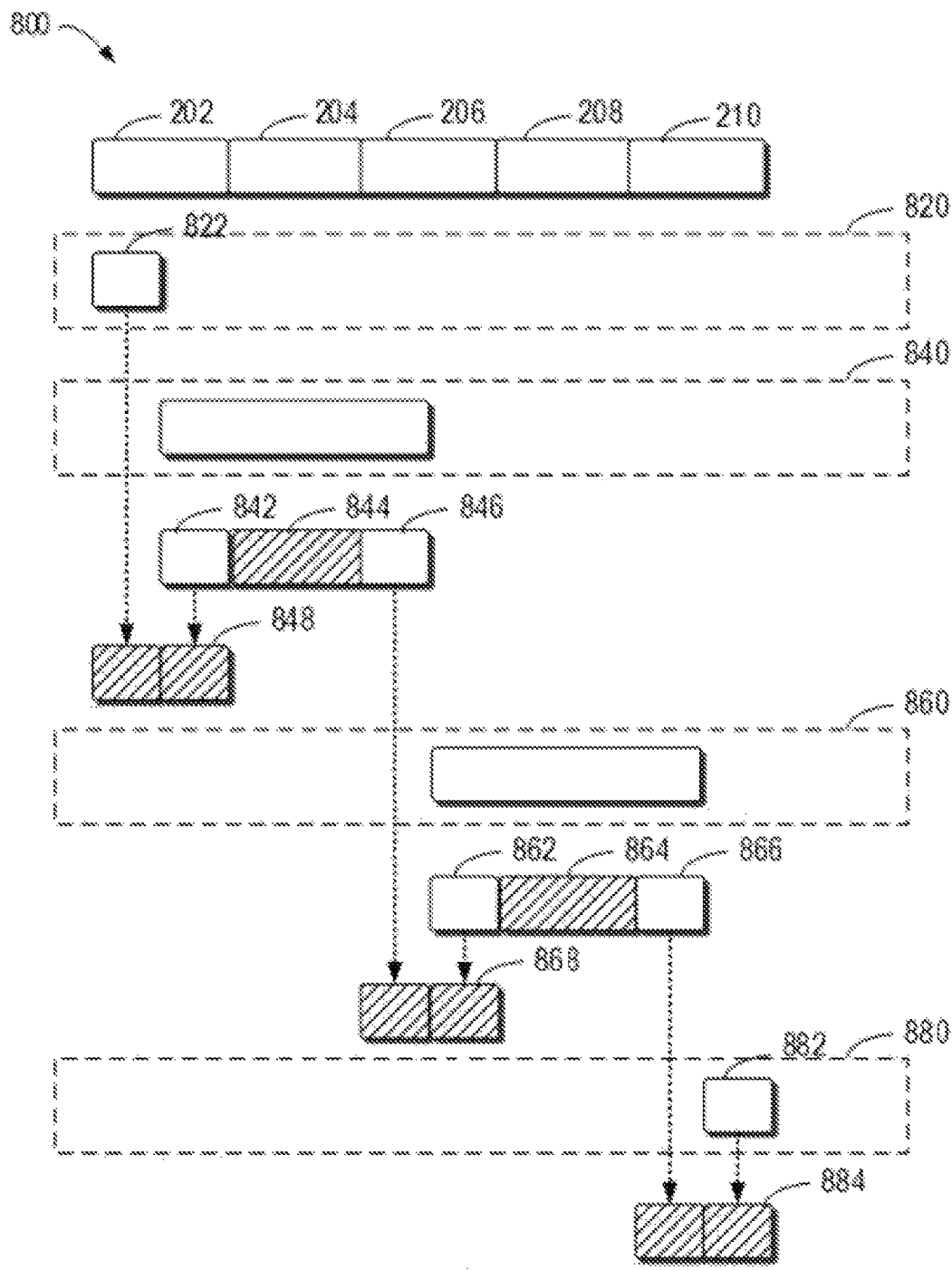
FIG. 8 illustrates a schematic diagram of splitting and merging write requests according to embodiments of the present disclosure.

Besides, the present disclosure also proposes a solution for further improving concurrency level of the write requests by adjusting granularity of the write request. A method for splitting and merging write requests according to embodiments of the present disclosure will be described in details with reference to FIGS. 7-8, wherein FIG. 7 illustrates a flowchart of a method 700 for non-aligned data write according to embodiments of the present disclosure, and FIG. 8 illustrates a schematic diagram 800 of non-aligned data write according to embodiments of the present disclosure.

At block 702, the system receives a first write request. At block 704, the system splits the first write request into at least one sub-request. Specifically, with reference to FIG. 8, because the target area for the write request 820 is smaller than a single logic data unit, its sub-request 822 is the original write request 820 per se; for the write request 840, its target area is greater than a single logic data unit, so it can be split into three sub-requests: a sub-request 842 smaller than the single logic data unit size, a sub-request 844 corresponding to the logic data unit 104 and a sub-request 846 smaller than the single logic data unit size. Likewise, the write request 860 can be split into sub-request 862, sub-request 864 and sub-request 866 while the sub-request 882 of the write request 880 is the write request 880 itself.

In some embodiments, the write request can be split according to an offset of logic data unit. For example, with reference to FIG. 8, the offset of the logic data unit 202 can be 0 KB-8 KB, the offset of the logic data unit 204 can be 8 KB-16 KB, the offset of the logic data unit 206 can be 16 KB-24 KB, the offset of the logic data unit 208 can be 24 KB-32 KB, and the offset of the logic data unit 210 can be 32 KB-40 KB. Therefore, for the write request 840 having a target area for 4 KB-20 KB, the system can split, based on the offset of the logic data units 202, 204 and 206, the target area for the write request 840 into three target areas: 4 KB-8 KB, 8 KB-16 KB and 16 KB-20 KB. The three target areas will correspond respectively to three sub-requests 842, 844 and 846 of the write request 840.

At block 706, the system determines whether there is a first sub-request with a target area smaller than a single logic data unit size. If the system determines there being the first sub-request, the method proceeds to block 710. At block 710, the system will determine whether there is a currently suspended second write request which can be merged with the first sub-request; otherwise, the method proceeds to block 708. At block 708, the system can execute the write request according to method 300.

In some embodiments, the system can determine whether there is a second write request which can be merged through the following steps of: determining a first target area for a first sub-request; determining a second target area for a second write request; determining whether the first target area and the second target area are adjacent; if the first target area is adjacent to the second target area, determining the merged area of the first target area and the second target area falls within a single logic data unit; if the merged area falls within the single logic data unit, determining that the first sub-request can be merged with the second sub-request. For example, with reference to FIG. 8, the target area for the sub-request 842 is 4 KB-8 KB while the target area for the currently suspended sub-request 822 is 0 KB-4 KB; the target areas of the two sub-requests are adjacent to one another and the merged target area is 0 KB-8 KB, which falls within the logic data unit 202. Therefore, the sub-request 822 can be merged with the sub-request 842.

In some embodiments, the system further determines a ratio of a target area for the two sub-requests which can be merged to the single logic data unit, and then further determines whether to merge the two sub-requests. In some embodiments, the system can compare the ratio with a predetermined ratio threshold. When the ratio is greater than the preset threshold, the two sub-requests are to be merged. For example, with reference to FIG. 8, assuming the target area for the sub-request 822 is 1 KB-4 KB while the target area for the sub-request 842 is 4 KB-8 KB, and the target areas of the two sub-requests are adjacent, the merged target area is 1 KB-8 KB and its ratio to the single logic data unit is 7/8. If the predetermined threshold of the system is no greater than 7/8, the system can merge the sub-requests 822 and 842; if the predetermined threshold of the system is greater than 7/8, the system may not merge the sub-requests 822 and 842.

If the system determines that there is not a second write request that can be merged with the first write sub-request, the method proceeds to block 712, i.e., the system will suspend the first write sub-request; otherwise, the method proceeds to block 714. At block 714, the system can determine to merge the first sub-request and the second write request to form a new write request for execution. For example, with reference to FIG. 8, the sub-request 822 can be merged with the sub-request 842 to form a new write request 848; the sub-request 846 can be merged with the sub-request 862 to form a new write request 868; and the sub-request 866 can be merged with the sub-request 882 to form a new write request 884.

Based on a plurality of new write requests formed through splitting and merging, the system can concurrently execute the write requests 844, 848, 864, 868 and 884 according to the concurrent method described above. Thus, a plurality of write requests that require serial execution in the prior art shown by FIG. 2 can all be executed in parallel, which greatly improves response speed of the system.

Figure 9:
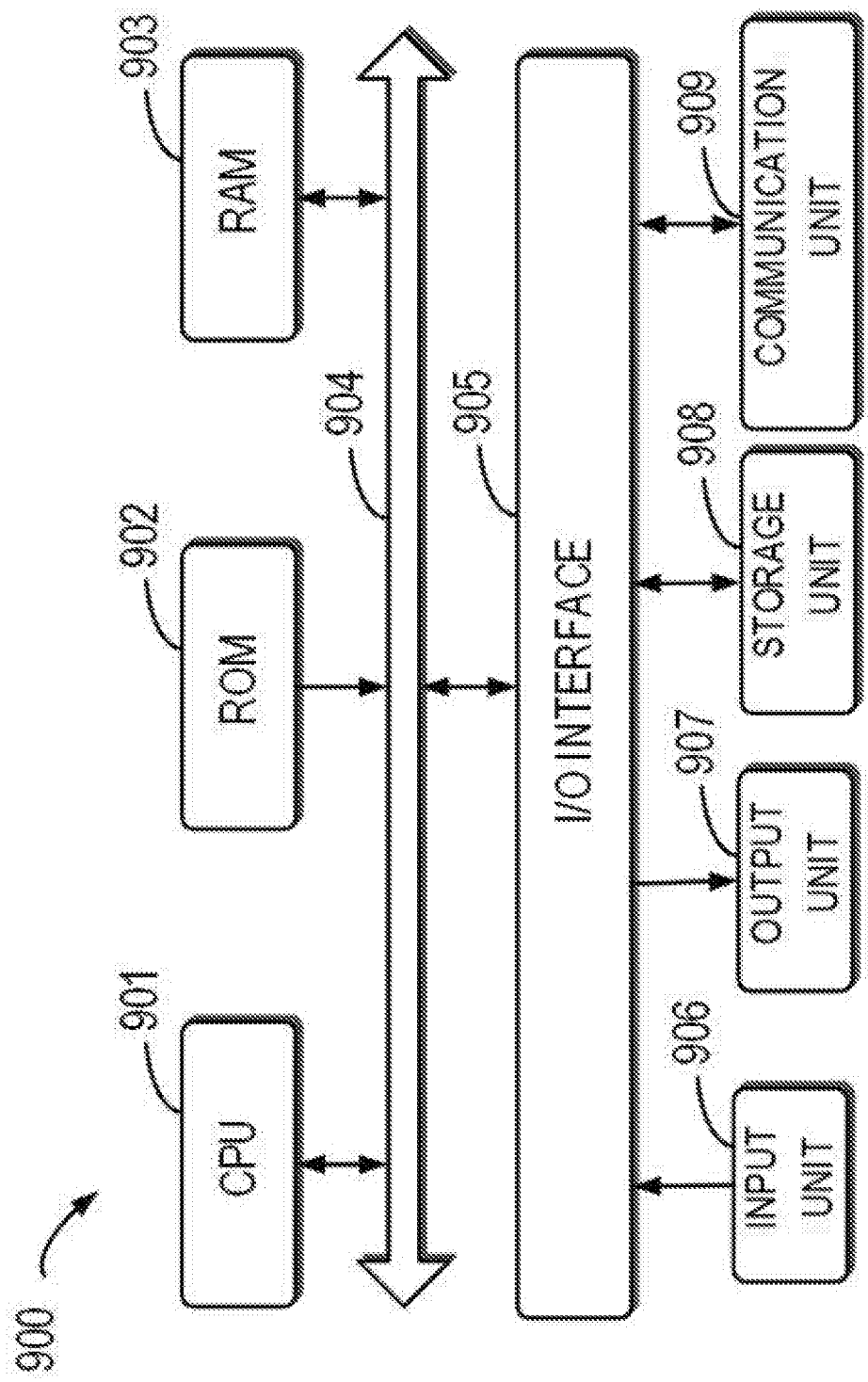
FIG. 9 illustrates a schematic diagram of an example device for implementing embodiments of the present disclosure.

FIG. 9 is a schematic block diagram of an example apparatus that can be used to implement embodiments of the present disclosure. As shown in FIG. 9, the apparatus 900 comprises a central processing unit (CPU) 901 which is capable of performing various processes in accordance with computer program instructions stored in a read only memory (ROM) 902 or computer program instructions loaded from a storage unit 908 to a random access memory (RAM) 903. In the RAM 903 are stored various programs and data as required by operation of the apparatus 900. The CPU 901, the ROM 902 and the RAM 903 are connected to one another via a bus 904. An input/output (I/O) interface 906 is also connected to the bus 904.

The following components in the device 900 are connected to the I/O interface 905: an input unit 906 including a keyboard, a mouse, or the like; an output unit 907 such as various types of displays and speakers; the storage unit 908 such as a magnetic disk or optical disk; and a communication unit 909 such as a network card, a modem, a wireless communication transceiver or the like. The communication unit 909 allows the device 900 to exchange information/data with other devices through a computer network such as the Internet and/or various types of telecommunication networks.

The processing unit 901 performs various method and processes described above, for example methods 300 and/or 700. For example, in some embodiments, the method 300 and/or 700 may be implemented as a computer software program or computer program product, which is tangibly contained in a machine-readable medium, for example the storage unit 908. In some embodiments, part or all of the computer program may be loaded and/or installed on the device 900 via ROM 902 and/or communication unit 909. When the computer program is loaded in the RAM 903 and executed by CPU 901, one or more acts of the method 300 and/or 700 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing write requests, comprising:
   in response to receiving a first write request for a file system, splitting the first write request into a first set of sub-requests;
   in response to receiving a second write request for the file system, splitting the second write request into a second set of sub-requests; and
   in response to detecting that a first sub-request of the first set of sub-requests and a second sub-request of the second set of sub-requests are contiguous in a storage area of the file system, merging the first sub-request with the second sub-request for writing,
   wherein the first write request and the second write request are directed to respective ranges of the storage area of the file system, the storage area including logic data units of uniform size, and
   wherein splitting the first write request into the first set of sub-requests is performed (i) at a first boundary between a first logic data unit and a second logic data unit, and (ii) at a second boundary between the second logic data unit and a third logic data unit.

2. The method of claim 1, wherein merging the first sub-request with the second sub-request forms an area in the storage area that does not cross any boundary between adjacent logic data units.

3. The method of claim 1, further comprising:
   in response to receiving a third write request that occupies an entire logic data unit of the logic data units, executing the third write request without splitting or merging the third write request with any other write request or sub-request.

4. The method of claim 1, wherein splitting the first write request into the first set of sub-requests is performed in response to the first write request specifying data that extends across a boundary between adjacent logic data units.

5. The method of claim 4, wherein merging the first sub-request with the second sub-request includes combining the first sub-request and the second sub-request in an area that does not cross any boundary between adjacent logic data units.

6. The method of claim 1, wherein the first, second, and third logic data units each include respective portions of data specified by the first write request.

7. The method of claim 6, further comprising:
   in response to receiving a third write request for a file system, splitting the third write request into a third set of sub-requests; and
   in response to detecting that a third sub-request of the third set of sub-requests and a fourth sub-request of the first set of sub-requests are contiguous in the storage area, merging the third sub-request with the fourth sub-request for writing.

8. A computerized system, comprising control circuitry that includes a set of processing units coupled to memory, the control circuitry constructed and arranged to:
   in response to receiving a first write request for a file system, split the first write request into a first set of sub-requests;
   in response to receiving a second write request for the file system, split the second write request into a second set of sub-requests; and
   in response to detecting that a first sub-request of the first set of sub-requests and a second sub-request of the second set of sub-requests are contiguous in a storage area of the file system, merge the first sub-request with the second sub-request for writing, wherein the first write request and the second write request are directed to respective ranges of the storage area of the file system, the storage area including logic data units of uniform size, and wherein the control circuitry is constructed and arranged to split the first write request into the first set of sub-requests (i) at a first boundary between a first logic data unit and a second logic data unit, and (ii) at a second boundary between the second logic data unit and a third logic data unit.

9. The computerized system of claim 8, wherein the control circuitry is further constructed and arranged to merge the first sub-request with the second sub-request to form an area in the storage area that does not cross any boundary between adjacent logic data units.

10. The computerized system of claim 8, wherein the control circuitry is further constructed and further arranged to:

in response to receiving a third write request that occupies an entire logic data unit of the logic data units, execute the third write request without splitting or merging the third write request with any other write request or sub-request.

11. The computerized system of claim 8, wherein the control circuitry is further constructed and further arranged to:

split the first write request into the first set of sub-requests in response to the first write request specifying data that extends across a boundary between adjacent logic data units.

12. A computer program product including a set of non-transitory, computer-readable media having instructions which, when executed by control circuitry of a computerized system, cause the control circuitry to perform a method of managing write requests, the method comprising:

in response to receiving a first write request for a file system, splitting the first write request into a first set of sub-requests;

in response to receiving a second write request for the file system, splitting the second write request into a second set of sub-requests; and in response to detecting that a first sub-request of the first set of sub-requests and a second sub-request of the second set of sub-requests are contiguous in a storage area of the file system, merging the first sub-request with the second sub-request for writing, wherein the first write request and the second write request are directed to respective ranges of the storage area of the file system, the storage area including logic data units of uniform size, and wherein splitting the first write request into the first set of sub-requests is performed (i) at a first boundary between a first logic data unit and a second logic data unit, and (ii) at a second boundary between the second logic data unit and a third logic data unit.

13. The computer program product of claim 12, wherein merging the first sub-request with the second sub-request forms an area in the storage area that does not cross any boundary between adjacent logic data units.

14. The computer program product of claim 12, wherein the method further comprises:

in response to receiving a third write request that occupies an entire logic data unit of the logic data units, executing the third write request without splitting or merging the third write request with any other write request or sub-request.

15. The computer program product of claim 12, wherein splitting the first write request into the first set of sub-requests is performed in response to the first write request specifying data that extends across a boundary between adjacent logic data units.

16. The computer program product of claim 12, wherein the first, second, and third logic data units each include respective portions of data specified by the first write request.

17. The computer program product of claim 16, wherein the method further comprises:

in response to receiving a third write request for a file system, splitting the third write request into a third set of sub-requests; and in response to detecting that a third sub-request of the third set of sub-requests and a fourth sub-request of the first set of sub-requests are contiguous in the storage area, merging the third sub-request with the fourth sub-request for writing.

\* \* \* \* \*